(12) United States Patent
Habbouche et al.

(10) Patent No.: US 11,520,842 B2
(45) Date of Patent: Dec. 6, 2022

(54) FIGURE DRIVEN SEARCH QUERY

(71) Applicant: INTERNATIONAL BUSINESS MACHINES CORPORATION, Armonk, NY (US)

(72) Inventors: Joyce Miryam Habbouche, Ottawa (CA); Mohamad F. Kalil, Ottawa (CA); Stephen David Gibson, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/947,049

(22) Filed: Jul. 16, 2020

(65) Prior Publication Data
US 2022/0019633 A1 Jan. 20, 2022

(51) Int. Cl.
*G06F 16/532* (2019.01)
*G06F 16/9535* (2019.01)

(52) U.S. Cl.
CPC ........ *G06F 16/9535* (2019.01); *G06F 16/532* (2019.01)

(58) Field of Classification Search
CPC ............... G06F 16/9535; G06F 16/532; G06F 16/9536; G06F 16/9538; G06F 16/50
See application file for complete search history.

(56) References Cited

U.S. PATENT DOCUMENTS

| 5,608,899 | A | * | 3/1997 | Li | G06F 16/248 |
| 9,384,181 | B2 | | 7/2016 | Fisher | |
| 10,297,061 | B2 | | 5/2019 | Wong | |
| 10,467,262 | B2 | | 11/2019 | Sharma | |
| 10,606,884 | B1 | * | 3/2020 | Mongrain | G06F 16/9038 |
| 2007/0067211 | A1 | * | 3/2007 | Kaplan | G06Q 10/10 705/7.31 |
| 2009/0157630 | A1 | * | 6/2009 | Yuan | G06Q 10/101 |
| 2010/0064229 | A1 | | 3/2010 | Lau | |
| 2012/0005045 | A1 | * | 1/2012 | Baker | G06F 16/335 705/27.2 |
| 2017/0140068 | A1 | * | 5/2017 | Oh | G06F 16/9038 |
| 2017/0351753 | A1 | * | 12/2017 | Duncker | G06F 16/338 |

OTHER PUBLICATIONS

Anonymous, "Dundas BI Product Features", Dundas Data Visualization, Feb. 25, 2020, 36 pages, Retrieved from the Internet: <URL: https://www.dundas.com/dundas-bi/features>.

Disclosed Anonymously, "System and Method for visualizing data by sentiment, example and other aspects", IP.com, Jul. 2, 2018, 7 pages, IP.com No. IPCOM000254468D, Retrieved from the Internet: <URL: https://priorart.ip.com/IPCOM/000254468>.

(Continued)

*Primary Examiner* — Kris E Mackes
(74) *Attorney, Agent, or Firm* — Samuel A. Waldbaum

(57) ABSTRACT

Embodiments of the present invention disclose a method, computer program product, and system for determining at least one characteristic about a figure and searching a data set based on an indicated search area for at least one entry that falls within a threshold value of the determined at least one characteristic about the figure, wherein the search area indicates which part of the data set to be searched. Displaying the at least one entry from the data set that falls within a threshold value of the determined at least one characteristic about the figure.

6 Claims, 8 Drawing Sheets

(56) References Cited

OTHER PUBLICATIONS

El-Shimy, "Create interactive dashboards on Watson Studio", IBM Developer, Updated Aug. 10, 2018, Published Jun. 11, 2018 [accessed on Feb. 25, 2020], 23 pages, Retrieved from the Internet: <URL: https://developer.ibm.com/technologies/analytics/tutorials/create-interactive-dashboards-on-watson-studio/>.

Mell, et al., "The NIST Definition of Cloud Computing", National Institute of Standards and Technology, Special Publication 800-145, Sep. 2011, 7 pages.

Mutlu, et al., "VizRec: Recommending Personalized Visualizations", ACM Transactions on Interactive Intelligent Systems, Jan. 2016, 40 pages, vol. V, No. N, Article A, Retrieved form the Internet: <URL: https://www.christophtrattner.info/pubs/ACM-TIIS.pdf>.

* cited by examiner

FIGURE DRIVEN SEARCH QUERY

BACKGROUND

The present invention relates generally to the field of searching a database, and more particularly to searching a database based on a trend described in a figure and/or a text.

Searching databases to find items that match a query requests is common practice. A user inputs a text or draw a figure, where the text/figure describes the parameters for the desired search. The search engine searches a database based on the inputted text/figure and sends the results to the user.

BRIEF SUMMARY

Additional aspects and/or advantages will be set forth in part in the description which follows and, in part, will be apparent from the description, or may be learned by practice of the invention.

Embodiments of the present invention disclose a method, computer program product, and system for determining at least one characteristic about a figure and searching a data set based on an indicated search area for at least one entry that falls within a threshold value of the determined at least one characteristic about the figure, wherein the search area indicates which part of the data set to be searched. Displaying the at least one entry from the data set that falls within a threshold value of the determined at least one characteristic about the figure.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION

Figure 1:
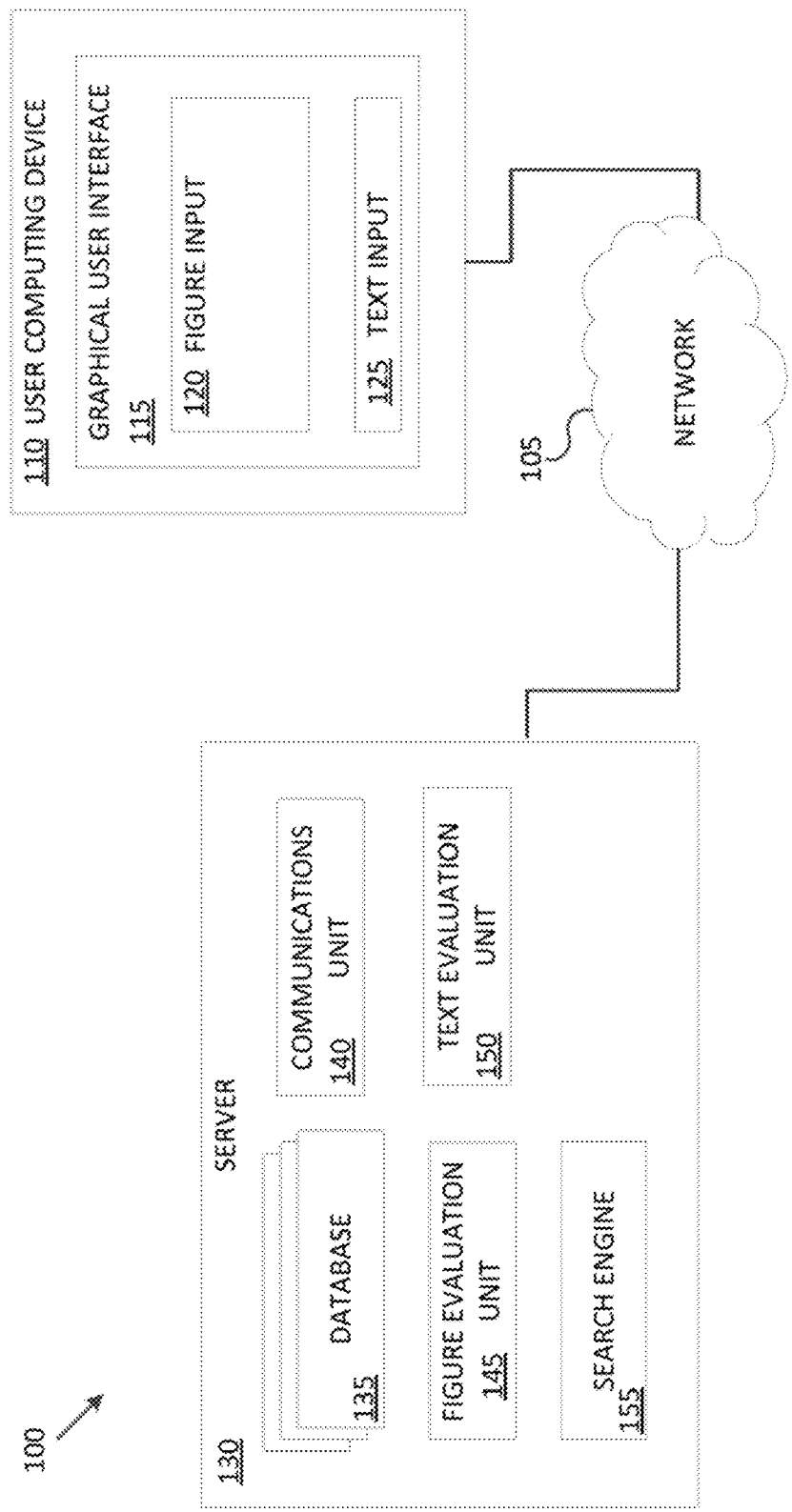
FIG. 1 is a functional block diagram illustrating a search engine, in accordance with an embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the area clearly dictates otherwise. Thus, for example, reference to "a component surface" includes reference to one or more of such surfaces unless the area clearly dictates otherwise.

Reference will now be made in detail to the embodiments of the present invention, examples of which are illustrated in the accompanying drawings, wherein like reference numerals refer to like elements throughout. Embodiments of the invention are generally directed to a system for conducting a search of a database or a data set search directly, where a query (usually written in sql or any other language that the database understands) is provided and a figure shows a trend to filter the result. In a second situation a natural language search question is provided, where NLG engine interprets the question to SQL language (or any other database language) then filter the result based on the trends showed in the provided figure. Search query for NLQ and conversation AI systems are usually presented in a text format. The text query usually describes a natural language query, for example, what are the average sales which can be translated into the search language. The present invention relates generally to the field of searching a database, and more particularly to searching a database based on a trend described in a figure in conversational business intelligence (BI) systems. In conversational business intelligence (BI) systems, a natural language search query typically referencing specific columns in the dataset (or database). For instance, "what is the total sales by product" could be a query involving sales and product columns in the database. Users usually limit the search using filtering phrases such as "what is total sales by product in 2017" or "what is total sales for Product A in 2010, 2012, and 2020".

The present invention is directed to utilizing a figure as a filtering phrase to limit the amount of information shown. For example, a user can draw a line graph, a bar graph, or a pie graph in a user interface, and the figure evaluation unit analyzes the graph. The received graph is analyzed to identified characteristics of the graph, for example, the characteristics may be the slope of the line in the line graph, the height of each of the bars of the bar graph, or the area of each section of pie graph.

The search engine searches a database for data entries that will fall within a threshold value of the characteristics of the graph. Once the items are identified the user is presented with a list of items that fall within the threshold. The items are displayed in a ranked fashion such that the items that fall within a threshold value of the characteristics of the graph are displayed at the top of the list.

FIG. 1 is a functional block diagram illustrating a search engine 100, in accordance with an embodiment of the present invention.

A user computing device 110 may be a laptop computer, tablet computer, netbook computer, personal computer (PC), a desktop computer, a personal digital assistant (PDA), a smart phone, or any programmable electronic device capable of communicating with server 130 via network 110. The user computing device 110 includes a graphical user interface 115, a figure input unit 120, a text input unit 125. The graphical user interface 115 can be, for example, a browser, a separate search engine, a stand-alone application, or a feature of an application. The graphical user interface 115 can display the contents of a database 135 or a dataset. The user indicates the search area of the database 135, or data set that he would like searched. The search area is selected by the user touching the column/row/grouping (if the user computing device 110 is a touch screen or by clicking on it with a mouse) or by the user typing text in a text input unit 125 to limit the search area.

The graphical user interface 115 has a figure input unit 120 that allows the user to input a figure. The graphical user interface 115 can be a touch screen or a traditional display that contains the figure input unit 120 that allows the user input desired graph by hand or by utilizing a device, for example, a pen or a mouse, to input the desired figure to be searched. The graphical user interface 115 allows the user to indicate the search area of the database 135 or the search area of the data set. The graphical user interface 115 can further have a text input unit 125 that allows the user to enter text to limit the search area. User computing device 110 may include internal and external hardware components, as depicted, and described in further detail with respect to FIG. 6.

Network 105 can be, for example, a local area network (LAN), a wide area network (WAN) such as the Internet, or a combination of the two, and can include wired, wireless, or fiber optic connections. In general, network 105 can be any combination of connections and protocols that will support communications between user computing device 110 and the server 130.

Figure 7:
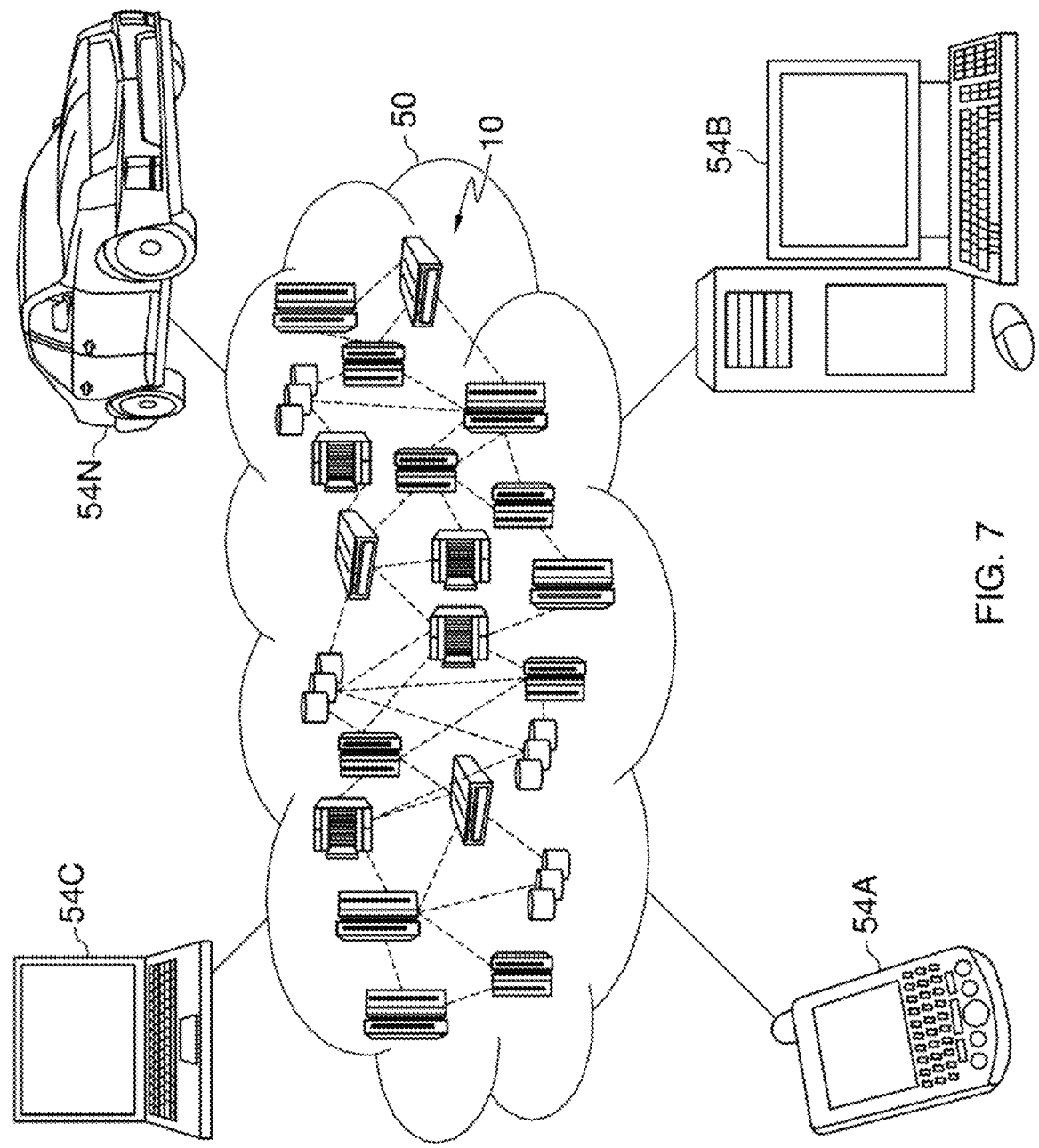
FIG. 7 depicts a cloud computing environment according to an embodiment of the present invention.
Figure 8:
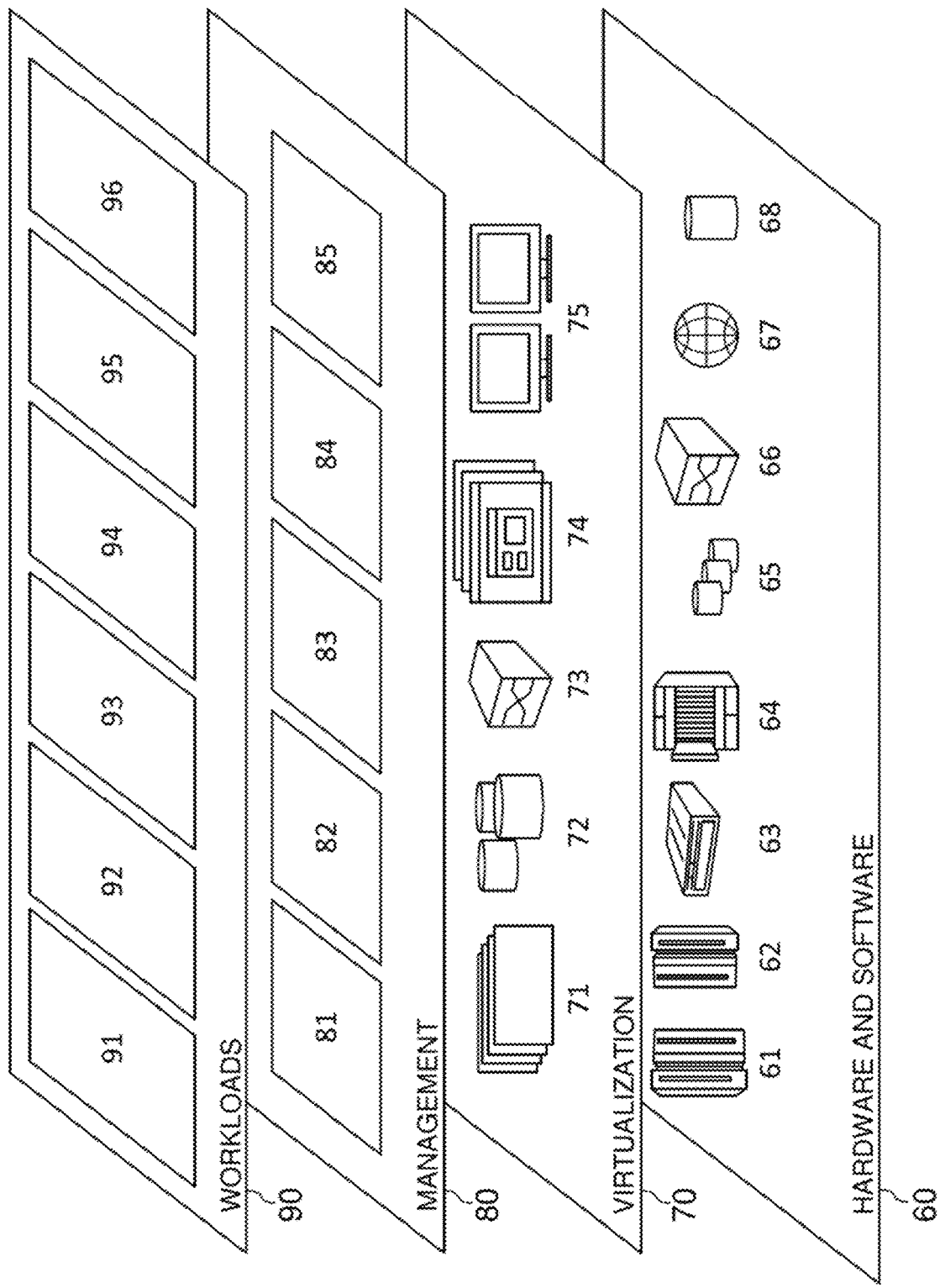
FIG. 8 depicts abstraction model layers according to an embodiment of the present invention.

Server 130 may be a laptop computer, tablet computer, netbook computer, personal computer (PC), a desktop computer, a personal digital assistant (PDA), a smart phone, or any programmable electronic device capable of communicating with client devices 104, 106, and 108 via network 110 and with various components and devices within enterprise grid 112. In other embodiments, server 130 may include internal and external hardware components, as depicted, and described in further detail below with respect to FIG. 6, and operate in a cloud computing environment, as depicted in FIGS. 7 and 8.

Server 130 includes a database 135, a communications unit 140, a figure evaluation unit 145, a text evaluation unit 150, and a search engine 155. The database 135 can be comprised of one database or a plurality of database, that act as data storage. The database 135 can be a traditional database utilized for data storage or it can be a data set, such as, a spreadsheet, that is utilized with a different program. The data stored in the database 135 can be, for example, sales data, product data, stock pricing, health information, drug information, or any other type of data. The database 135 allows for the addition, modification, or deletion of data contained therein. The communications unit 140 can transmit and receive data via the network 105.

Figure 2:
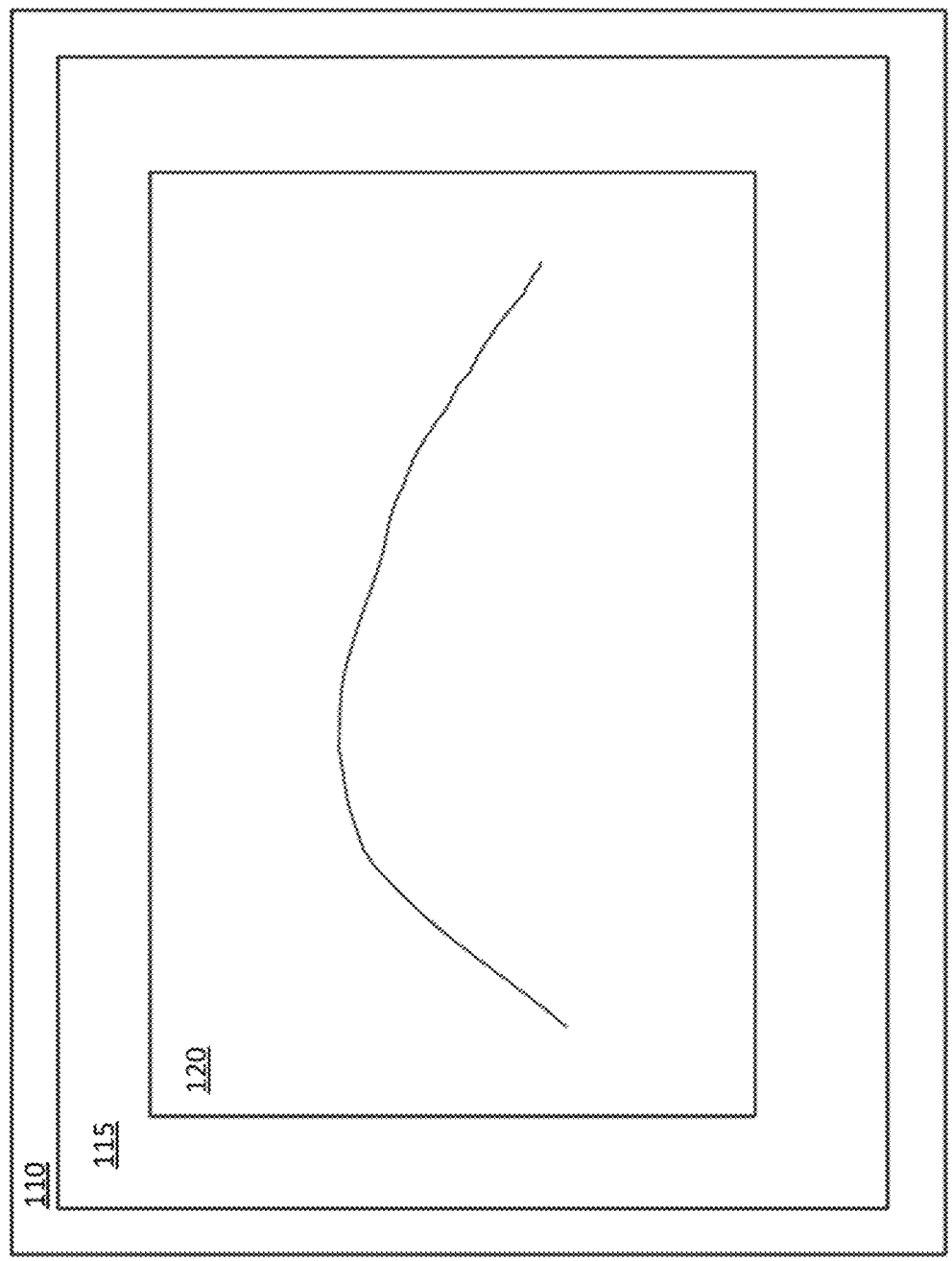
FIG. 2 illustrates user computing devices for inputting a figure, in accordance with an embodiment of the present invention.
Figure 3:
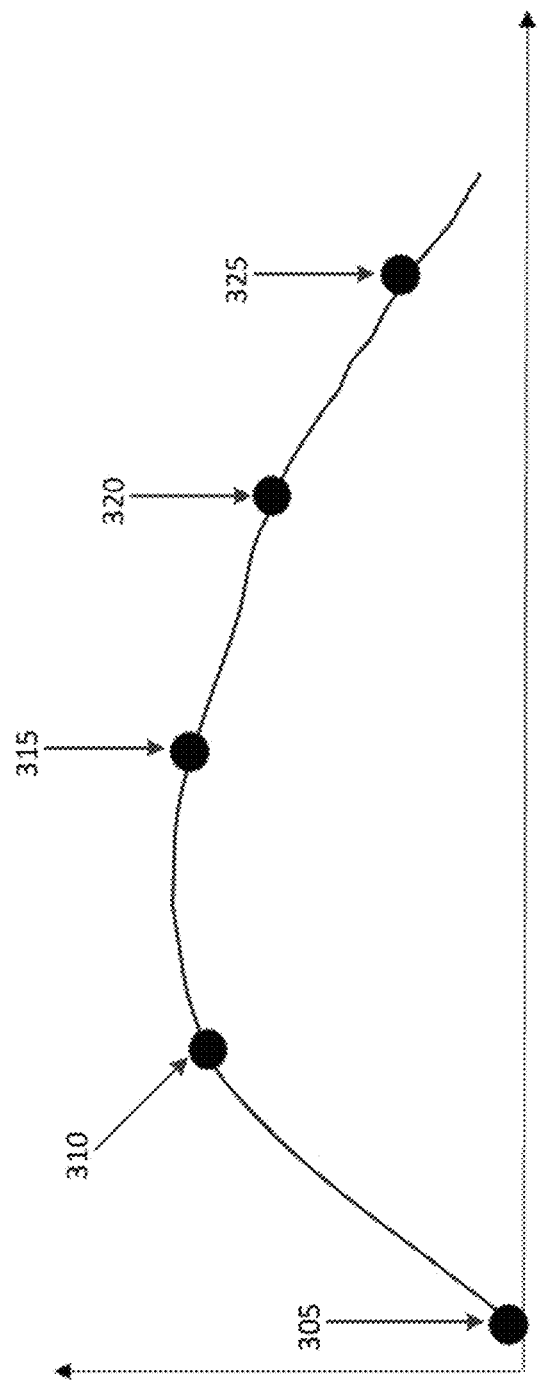
FIG. 3 illustrates the analysis of the received figure to determine the figure characteristics, in accordance with an embodiment of the present invention.

The figure evaluation unit 145 receives the figure sent by the user computing device 110. The user is able to send any type of graph that they want to act as a filtering agent, for example, that the user may simply send a certain trend or skew in a larger graph as input, i.e. they are looking for a downward slope or a sharp rise, etc. The figure evaluation unit 145 analyzes the figure/graph to determine the characteristics of the figure or graph. FIGS. 2 and 3 show a line graph submission, but a user can submit other types of graphs, for example, the user could submit a bar graph, a pie graph, or a different type of graph. The figure evaluation unit 145 determines the type of graph by comparing the received graph against stored samples of different types of graphs. Once the type of graph is known, the characteristics of the graph can be determined by the figure evaluation unit 145.

For example, if the user computing device sends a line graph, as illustrated by FIG. 2, the figure evaluation unit 145 assigns points to the line graph. FIG. 3 illustrates that the figure evaluation unit 145 assigning multiple points, for example, 305, 310, 315, 320, 325 and determines the slope between the points. The figure evaluation unit 145 assigns a point that will be a zero value, for example point 305. By assigning a zero value allows for the graph to be assigned values along the x-axis and the y-axis. The other points 310, 315, 320 and 325 can be assigned at a set interval along the graph. By assign a value along the x-axis and the y-axis and by assigning multiple points along the graph, allows for the figure evaluation unit 145 to calculate the slope of the graph between the points. The slope of the graph between the points represents the characteristics of the line graph.

For example, if the received graph is a bar graph, the figure evaluation unit 145 assigns a zero value to the bottom of each of the bars and assigns a value along the x-axis and y-axis. Then the figure evaluation unit 145 determines the number of bars along the one axis and determines how far each of the bars extends along the each of the axis. The figure evaluation 145 determines the difference between each of the bars, i.e. how far they extend along each axis. The determined difference between the bars shows the trend, i.e. the characteristic, of the bar graph.

For example, if the received graph is a pie graph, the figure evaluation unit 145 assigning a zero value to the smallest slice. Once the smallest slice is determined then the figure evaluation unit 145 calculates the circumference of the pie graph. The figure evaluation unit 145 determines the number of slices in the pie graph and calculates the area for each of the slices. The characteristics of the pie gram is the number of slices in the pie graph and the area for each of the slices.

The text evaluation unit 150 evaluates any text that is received along with the received figure/graph. The text evaluation unit 150 is utilized when a natural language question is provided, but the text evaluation unit is not necessary when text query is not provided. The text evaluation unit 150 utilizing natural language processing to determine the limits for the search area contained within the text. For example, the text could provide limits to types of products, time frames, a disease progression rate, trends, and/or any other type of limitation that can be described by the received text.

The search engine 155 receives the analysis from the figure evaluation unit 145. The search engines 155 searches the database 135 or data set within the set search area, for example, search sales in a specific year. The search area is what columns/rows in a database or a dataset that were indicate by the user to search. The communications unit 140 can receive a user indicated search area, i.e. the user indicating which column to search, or the communications unit receives text accompanying the figure, as described above, where the text indicates the search area. The communications unit 140 can receive a user indicated search area, i.e. the user indicating which column to search, or the communications unit receives text accompanying the figure, as described above, where the text indicates the search area. The search engine 155 utilizes the received figure/graph as a filtering unit for the results of the searched data. The search engine 155 looks for the entries within the searched data results that that fall within a threshold of the determined characteristics of the received figure/graph.

A user can limit the search area by providing a text search query. As stated above, the text evaluation unit 150 evaluates the text search query and converts it is a search string. The searching engine 155 conducts a search based on the search string from the text evaluation unit for entries in the database 135 or dataset that meets the limits set query. The search engine 155 utilizes the received figure/graph as a filtering unit for the results of the searched data. The search engine 155 looks for the entries within the searched data results that that fall within a threshold of the determined characteristics of the received figure/graph.

Figure 4:
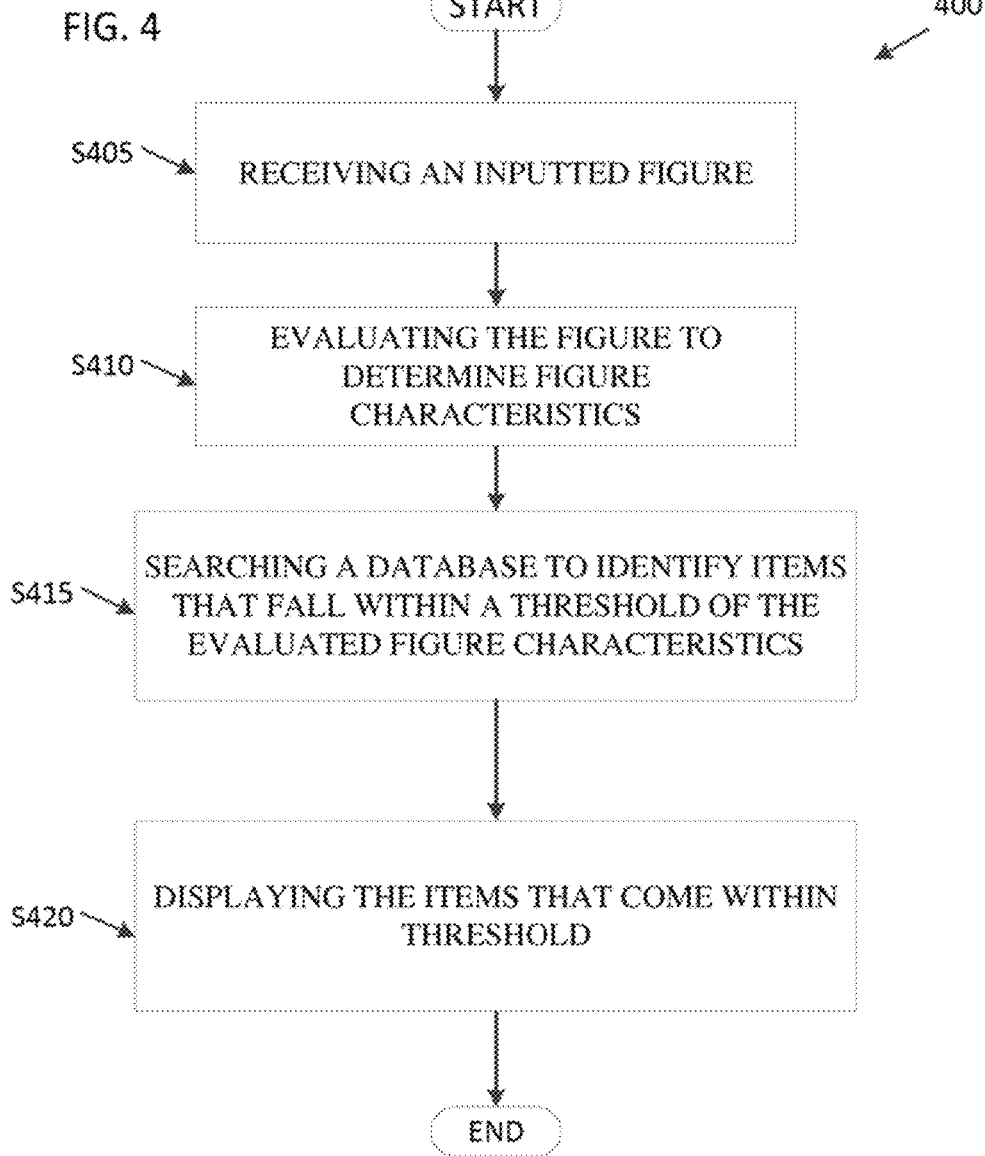
FIG. 4 is a flowchart depicting operational steps of the conducting a search based on a received figured in the processing environment of FIG. 1, in accordance with an embodiment of the present invention.

FIG. 4 is a flowchart depicting operational steps 400 of the conducting a search based on a received figured in the processing environment of FIG. 1, in accordance with an embodiment of the present invention.

The communications unit 140 of server 130 receives a figure from a user computing device 110 and a search area for the data to be search, where the search area is the user indicating which column/row/group that user would like to be searched. (S405). The figure evaluation unit 145 determines the type of graph that was received by comparing the graph against stored samples of different types of graphs (S410). Based on the type of graph received then the figure evaluation unit determines the characteristics of the graph (S410).

For example, if the received graph is a line graph, the figure evaluation unit 145 assigns a point that will be a zero value. By assigning a zero value allows for the graph to be assigned values along the x-axis and the y-axis. The figure evaluation unit 145 assigns points along the line in the graph at a set interval. By assign a value along the x-axis and the y-axis and by assigning multiple points along the graph, allows for the figure evaluation unit 145 to calculate the slope of the line between the points. The slope of the graph between the points represents the characteristics of the line graph.

For example, if the received graph is a bar graph, the figure evaluation unit 145 assigns a zero value to the bottom of each of the bars and assigns a value along the x-axis and y-axis. Then the figure evaluation unit 145 determines the number of bars along the one axis and determines how far each of the bars extends along the each of the axis. The figure evaluation 145 determines the difference between each of the bars, i.e. how far they extend along each axis. The determined difference between the bars shows the trend, i.e. the characteristic, of the bar graph.

For example, if the received graph is a pie graph, the figure evaluation unit 145 assigning a zero value to the smallest slice. Once the smallest slice is determined then the figure evaluation unit 145 calculates the circumference of the pie graph. The figure evaluation unit 145 determines the number of slices in the pie graph and calculates the area for each of the slices. The characteristics of the pie gram is the number of slices in the pie graph and the area for each of the slices.

The search engine 155 normalizes the data within the search area so the data is on the same scale as the determined characteristics of the graph. The search engine 155 searches the search area of the database 135 or the data set for entries that fall within the threshold limited of the determined characteristics of the figure/graph (S415). The communications unit 135 transmits the entries that are within threshold limit to the user computing device (S420).

Figure 5:
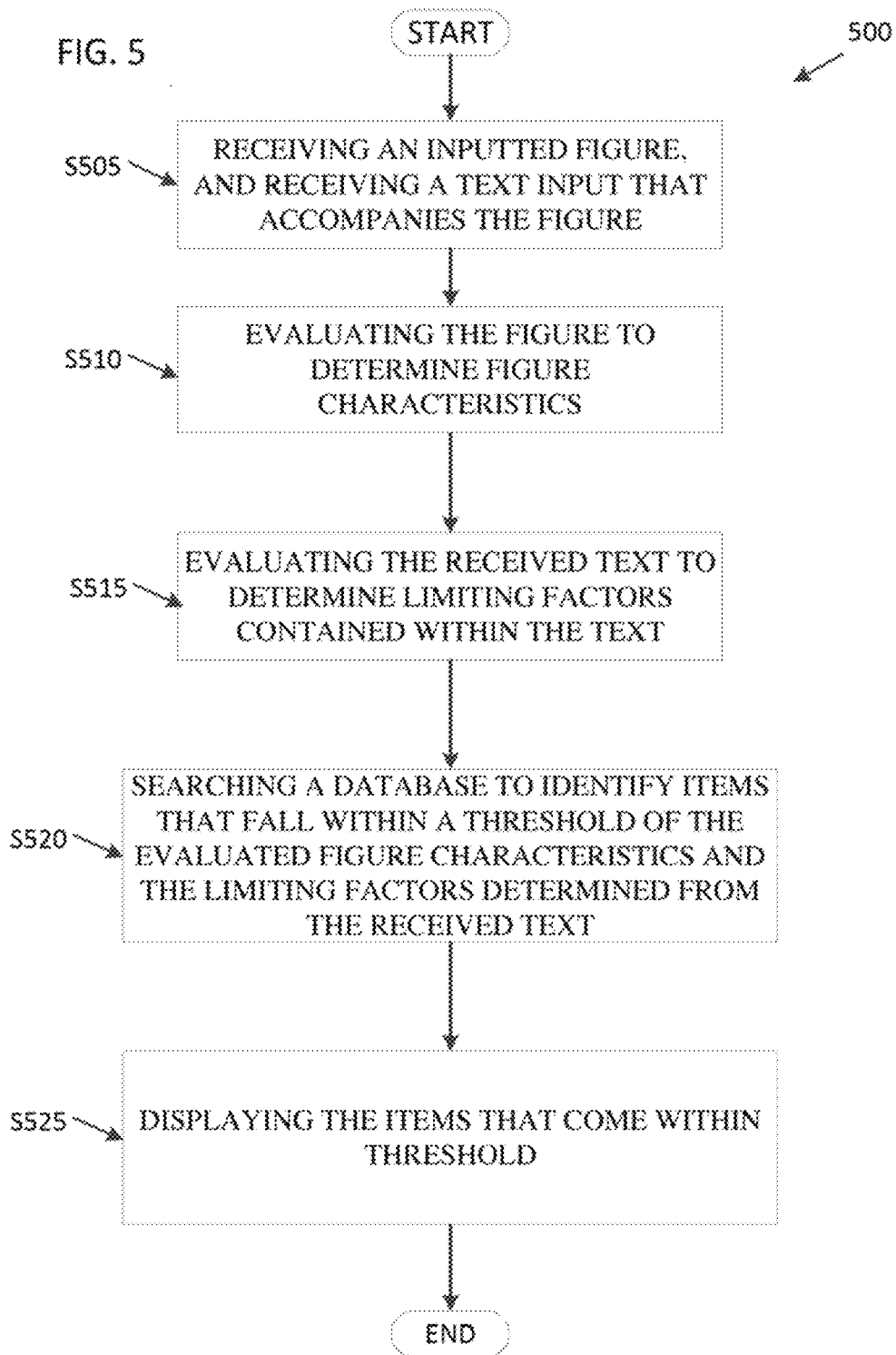
FIG. 5 is a flowchart depicting operational steps of the conducting a search based on a received figured and a received text in the processing environment of FIG. 1, in accordance with an embodiment of the present invention.

FIG. 5 is a flowchart depicting operational steps 500 of the conducting a search based on a received figured and a received text in the processing environment of FIG. 1, in accordance with an embodiment of the present invention.

The communications unit 140 of server 130 receives a figure from a user computing device 110 and accompanying text that indicates the search area from a user computing device 110 the user would like to be searched. (S505). The figure evaluation unit 145 determines the type of graph that was received by comparing the graph against stored samples of different types of graphs (S510). Based on the type of graph received then the figure evaluation unit determines the characteristics of the graph, as described above (S510). The text evaluation unit 150 analyzes the accompanying text to determine the limits for the search area (S515).

The search engine 155 normalizes the data within the search area so the data is on the same scale as the determined characteristics of the graph. The search engine 155 searches the database 135 or data set based on the determined search area for entries that fall within the threshold limited of the determined characteristics of the figure/graph (S520). The communications unit 135 transmits the entries that are within threshold limit to the user computing device (S525).

Figure 6:
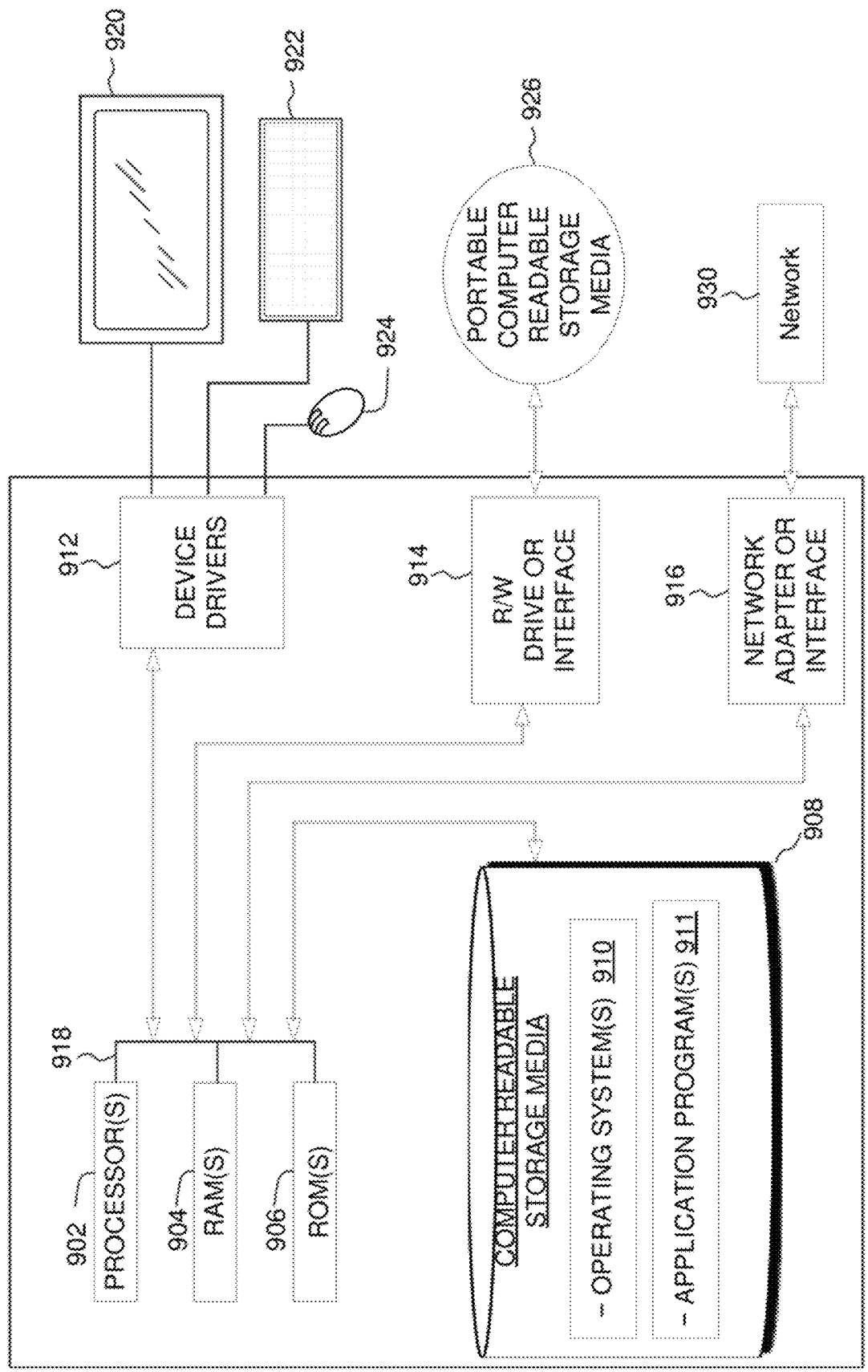
FIG. 6 is a block diagram of components of a computing device of the secure communication systems of FIG. 1 in accordance with embodiments of the present invention.

FIG. 6 depicts a block diagram of components of server 130 or user computing device 110 of FIG. 1, in accordance with an embodiment of the present invention. It should be appreciated that FIG. 6 provides only an illustration of one implementation and does not imply any limitations regarding the environments in which different embodiments may be implemented. Many modifications to the depicted environment may be made.

User computing device 110 and server 130 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. The network adapter 916 communicates with a network 930. Communications fabric 918 may be implemented with any architecture designed for passing data and/or control information between processors (such as microprocessors, communications, and network processors, etc.), system memory, peripheral devices, and any other hardware components within a system.

One or more operating systems 910, and one or more application programs 911, for example, figure evaluation unit 145 (FIG. 1), are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

User computing device 110 and server 130 may also include a R/W drive or interface 914 to read from and write to one or more portable computer readable storage media 926. Application programs 911 on user computing device 110 and server 130 may be stored on one or more of the portable computer readable storage media 926, read via the respective R/W drive or interface 914 and loaded into the respective computer readable storage media 908.

User computing device 110 and server 130 may also include a network adapter or interface 916, such as a Transmission Control Protocol (TCP)/Internet Protocol (IP) adapter card or wireless communication adapter (such as a 4G wireless communication adapter using Orthogonal Frequency Division Multiple Access (OFDMA) technology). Application programs 911 on user computing device 110 and server 130 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

User computing device 110 and server 130 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and figure evaluation unit 96.

Based on the foregoing, a computer system, method, and computer program product have been disclosed. However, numerous modifications and substitutions can be made without deviating from the scope of the present invention. Therefore, the present invention has been disclosed by way of example and not limitation.

While the invention has been shown and described with reference to certain exemplary embodiments thereof, it will be understood by those skilled in the art that various changes in form and details may be made therein without departing from the spirit and scope of the present invention as defined by the appended claims and their equivalents.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the one or more embodiment, the practical application or technical improvement over technologies found in the marketplace, or to enable others of ordinary skill in the art to understand the embodiments disclosed herein.

What is claimed is:

1. A method comprising:
   receiving, by a computer, a hand drawn figure;
   comparing, by the computer, the hand drawn figure to a plurality of figure type templates to determine a figure type of the hand drawn figure, wherein the figure type is a bar graph or a pie graph;
   in response to determining that the hand drawn figure is a bar graph, then determining, by the computer, a plurality of characteristics about the hand drawn figure, wherein the plurality of characteristics are a number of bars, the height of each bar, and the width of the bars contained in the hand drawn figure;
   in response to determining that the hand drawn figure is a pie graph, then determining, by the computer, a plurality of characteristics about the hand drawn figure, wherein the plurality of characteristics is a number of sections in the pie graph and the area of each of the sections;
   utilizing the hand drawn figure as a search query for conducting a search of a data set, wherein the search comprises searching, by the computer, the data set based on an indicated search area for at least one entry that falls within a threshold value of the determined plurality of characteristics about the hand drawn figure, wherein the search area indicates which part of the data set to be searched, wherein the figure was created independent of the searched data set; and
   displaying, by the computer, the at least one entry from the data set that falls within a threshold value of the determined plurality of characteristics about the hand drawn figure.

2. The method of claim 1, further comprising:
   determining, by the computer, the indicated search area based on a text entry that accompanied the hand drawn figure.

3. A computer program product comprising:
   one or more non-transitory computer-readable storage media and program instructions stored on the one or more non-transitory computer-readable storage media, the program instructions comprising:
   program instruction to receive a hand drawn figure;

program instruction to compare the hand drawn figure to a plurality of figure type templates to determine a figure type of the hand drawn figure, wherein the figure type is a bar graph or a pie graph;

in response to determining that the hand drawn figure is a bar graph, then program instructions to determine a plurality of characteristics about the hand drawn figure, wherein the plurality of characteristics are a number of bars, the height of each bar, and the width of the bars contained in the hand drawn figure;

in response to determining that the hand drawn figure is a pie graph, then program instructions to determine a plurality of characteristics about the hand drawn figure, wherein the plurality of characteristics is a number of sections in the pie graph and the area of each of the sections;

program instructions to utilize the hand drawn figure as a search query for conducting a search of a data set, wherein the search comprises searching the data set based on an indicated search area for at least one entry that falls within a threshold value of the determined plurality of characteristics about the hand drawn figure, wherein the search area indicates which part of the data set to be searched, wherein the hand drawn figure was created independent of the searched data set; and program instructions to display the at least one entry from the data set that falls within a threshold value of the determined plurality of characteristics about the hand drawn figure.

4. The computer program product of claim 3, further comprising:

program instructions to determine the indicated search area based on a text entry that accompanied the hand drawn figure.

5. A computer system comprising:

one or more computer processors, one or more computer-readable storage media, and program instructions stored on one or more of the computer-readable storage media for execution by at least one of the one or more processors, the program instructions comprising:

program instruction to receive a hand drawn figure;

program instruction to compare the hand drawn figure to a plurality of figure type templates to determine a figure type of the hand drawn figure, wherein the figure type is a bar graph or a pie graph;

in response to determining that the hand drawn figure is a bar graph, then program instructions to determine a plurality of characteristics about the hand drawn figure, wherein the plurality of characteristics are a number of bars, the height of each bar, and the width of the bars contained in the hand drawn figure;

in response to determining that the hand drawn figure is a pie graph, then program instructions to determine a plurality of characteristics about the hand drawn figure, wherein the plurality of characteristics is a number of sections in the pie graph and the area of each of the sections;

program instructions to utilize the hand drawn figure as a search query for conducting a search of a data set, wherein the search comprises searching the data set based on an indicated search area for at least one entry that falls within a threshold value of the determined plurality of characteristics about the hand drawn figure, wherein the search area indicates which part of the data set to be searched, wherein the figure was created independent of the searched data set; and program instructions to display the at least one entry from the data set that falls within a threshold value of the determined plurality of characteristics the hand drawn figure.

6. The computer system of claim 5, further comprising:

program instructions to determine the indicated search area based on a text entry that accompanied the hand drawn figure.

\* \* \* \* \*